United States Patent [19]

Laar et al.

[11] 4,279,371

[45] Jul. 21, 1981

[54] ARRANGEMENT FOR TRANSPORTING STRIP-SHAPED MATERIAL

[75] Inventors: Erwin Laar, Taufkirchen; Werner Sperber, Munich, both of Fed. Rep. of Germany

[73] Assignee: AGFA-Gevaert, A.G., Leverkusen, Fed. Rep. of Germany

[21] Appl. No.: 60,238

[22] Filed: Jul. 23, 1979

[30] Foreign Application Priority Data

Jul. 29, 1978 [DE] Fed. Rep. of Germany ....... 2833432

[51] Int. Cl.[3] ........................ B65H 17/24; G03B 1/56

[52] U.S. Cl. ........................................ 226/91; 226/173

[58] Field of Search ........................... 226/91, 92, 173; 354/312, 319, 340, 344-347; 24/139, 265 EC, DIG. 8, DIG. 10

[56] References Cited

U.S. PATENT DOCUMENTS

| | | | |
|---|---|---|---|
| 1,837,478 | 12/1931 | Paulson | 24/139 |
| 4,065,042 | 12/1977 | Zielinski | 226/92 |
| 4,072,260 | 2/1978 | Dove | 226/173 |

FOREIGN PATENT DOCUMENTS

| | | | |
|---|---|---|---|
| 14285 | of 1915 | United Kingdom | 242/74 |

*Primary Examiner*—Leonard D. Christian

*Attorney, Agent, or Firm*—Peter K. Kontler

[57] ABSTRACT

An arrangement for transporting strip-shaped material, particularly photographic paper, includes a one-piece elongated holding element which extends along a triple-turn hairpin course to form four holding sections which are substantially parallel to one another and define with each other three spaces for strip-shaped material. Two brackets which are welded to the end portions of the two outer sections of the holding element and are bent at right angle to the remainder of the respective outer sections support the holding element on a conveyor belt for travel therewith. The four sections of the holding element resiliently contact one another to clamp the strip-shaped material therebetween when such strip-shaped material is received between neighboring sections.

7 Claims, 3 Drawing Figures

ARRANGEMENT FOR TRANSPORTING STRIP-SHAPED MATERIAL

BACKGROUND OF THE INVENTION

The present invention relates to an arrangement for transporting strip-shaped material in general, and particularly for transporting photographic paper or the like.

It is already known to construct an arrangement of this type as a holding element which consists of round elongated material, the holding element being capable of holding the strip-shaped material and having a width greater than or equal to that of the strip-shaped material. Such holding element is equipped with a U-shaped or C-shaped bracket rigidly connected thereto, the bracket being attachable to a conveyor belt.

In an arrangement of this general type, the strip-shaped material, such as a paper band, which is to be transported along a predetermined path, such as threaded through a machine, for instance, a developing machine or the like in the event that the paper band is a photographic paper strip, is connected to the holding element, and the holding element is then connected to or suspended from the conveyor belt in that the respective region of the conveyor belt is received in and/or braces itself against the C-shaped or U-shaped bracket. The strip-shaped material is then transported along the path of movement of the conveyor belt, for instance, through the machine, and thus threaded through such machine. At the end of the threading operation, the holding element is detached from the conveyor belt by a suitable disengaging arrangement, and the transporting arrangement can be manually disengaged from the strip-shaped material.

An arrangement of this type is known, for instance, from the German published patent application DE-OS No. 25 05 429. This transporting arrangement includes a receiving portion for the strip-shaped material which constitutes the above-mentioned holding member and which consists of round material which is bent in a hairpin-like fashion to obtain two adjacent sections which resiliently contact one another when the strip-shaped material is absent from the space between these two sections. One of these sections has an extension which is connected to the U-shaped or C-shaped bracket. When the transporting arrangement is constructed in the above-mentioned manner, there exists the danger that the arrangement will tilt relative to the conveyor belt or that the round material will be bent in the region of the attaching location when the forces needed for transporting the strip-shaped material are substantial. In addition thereto, the clamping action of the bent round material can decrease after an extended period of use of this transporting arrangement.

OBJECTS AND SUMMARY OF THE INVENTION

It is an object of the invention to provide a transportation arrangement which is capable of transporting strip-shaped material and which does not exhibit the disadvantages of the prior-art arrangements of this type.

Another object of the instant invention is to so construct the transporting arrangement as to be able to operate properly when the accelerations and forces acting thereon are substantial.

Still another object of the invention is to so design the transporting arrangement as to assure positive holding action on the strip-shaped material even after an extended period of use of this arrangement.

A concomitant object of the invention is to develop a transporting arrangement of the type here under consideration which is simple in construction, reliable in operation, and inexpensive.

One feature of the present invention resides in the provision of an arrangement for transporting strip-shaped material, particularly photographic paper, which comprises a conveyor belt, means for holding the strip-shaped material including a one-piece elongated holding element extending along a triple-turn hairpin course to form four holding sections which are substantially parallel to one another and define three spaces for receiving the strip-shaped material, these sections having effective lengths at least equal to the width of the strip-shaped material, and means for attaching the holding element to the conveyor belt. Advantageously, at least the above-mentioned sections of the holding element (and preferably the entire holding element) have round cross-sections. It is further advantageous when the above-mentioned attaching means includes two brackets each of which is affixed to one of the free ends and connected to the conveyor belt in the assembled condition. Each of the brackets may preferably have a substantially C-shaped configuration to embrace the belt in the assembled condition.

When the transporting arrangement is constructed in the above-mentioned manner, the position of the attaching means relative to the conveyor belt hardly changes even when the forces acting thereon have substantial magnitudes. As a result of the use of two C-shaped brackets, the arrangement is sufficiently elastic particularly for travel around the support rollers for the conveyor so that there is avoided the danger that the C-shaped brackets would damage the conveyor belt. As a result of the double clamping action achieved by the holding member, the strip-shaped material is adequately held even when the clamping action of the individual pairs of sections of the holding element is somewhat reduced over a period of time.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
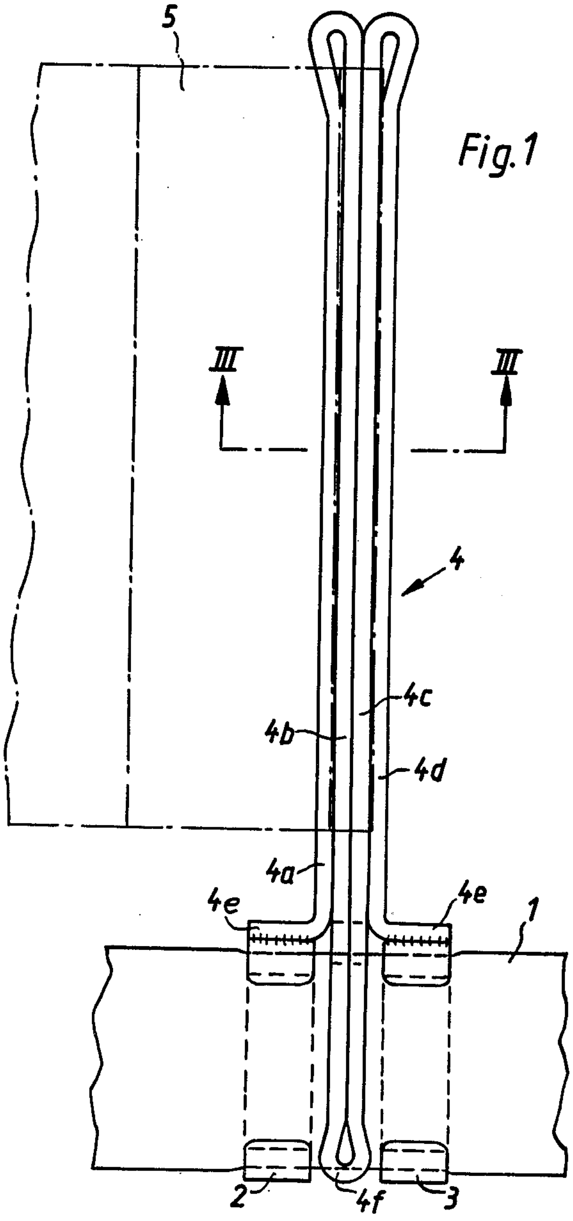
FIG. 1 is a top plan view of an arrangement according to the present invention.

Referring first to FIG. 1, the reference numeral 1 denotes a belt conveyor. The belt conveyor is preferably trained around a plurality of rollers for travel along a predetermined endless path through a developing machine or the like. Two U-shaped or C-shaped brackets 2 and 3 are connected to or suspended from the conveyor belt 1. Two brackets 2 and 3 are connected with one another merely by a clamp 4. The clamp 4 which constitutes a holding element for holding a strip-shaped material 5, such as photographic paper, is made of a round material, such as circular cross-section wire, which is bent three times in a hairpin fashion so that there come into existence four sections *4a* to *4d*. The expression "hairpin" is intended to indicate that the round material is bent not by only through 180°, but that it is bent at the connecting regions with a small radius, by more than 180°. However, the section of each pair of two neighboring sections *4a*–*4b*, *4b*–*4c*, *4c*–*4d* which are joined at the respective connecting region are parallel to one another so that there is achieved a mutual contact pressure between the respectively adjacent sections *4a* to *4d*. The bending of the round material is so performed that all four sections *4a* to *4d* are located substantially along a single common plane. However, when the conveyor belt 1 is received in the brackets 2 and 3, the inner two sections *4b* and *4c* are located in a plane which is slightly inclined with respect to the plane in which the sections *4a* and *4d* are located, while the respective neighboring sections *4a* and *4b*, *4b* and *4c*, and *4c* and *4d* contact one another. The two outer sections *4a* and *4d* are bent at right angles at the respective free ends to form end portions *4e* which are welded to the C-shaped or U-shaped brackets 2 and 3, respectively. In order to achieve an improved resistivity of the welded locations to deleterious influence of chemical substances, such as those used in a photographic process, these locations or the entire attachment are sand blasted.

Figure 2:
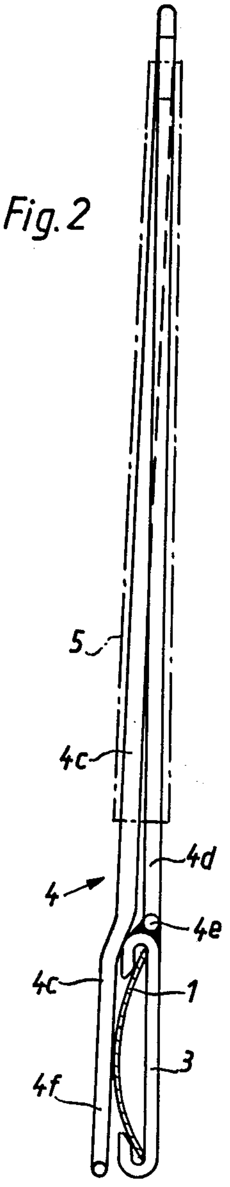
FIG. 2 is a side elevational view of the arrangement illustrated in FIG. 1.

The inner sections *4b* and *4c* are extended with respect to the two outer sections *4a* and *4d* by the width of the conveyor belt 1 or of the C-shaped or U-shaped brackets 2 and 3. As can best be seen in FIG. 2, the extended central portion *4f* has a slightly stepped configuration and extends through the space between the two brackets 2 and 3. Thus, this middle portion *4f* serves as an abutment portion for the conveyor belt 1, and it prevents the confined part of the conveyor belt 1 from leaving the brackets 2 and 3 during travel of the conveyor belt 1 about a roller.

Figure 3:
FIG. 3 is a sectional view taken on line III—III of FIG. 1.

Having so discussed the construction of the arrangement of the present invention, the use and operation thereof will now be explained. First, the strip-shaped material 5 is connected to the clamp or holding element 4, in that the material 5 is trained about the two inner sections *4b* and *4c* and the respective portions of the strip-shaped material 5 are clamped between the pairs of sections *4a* and *4b* or *4c* and *4d*, as can best be seen in FIG. 3. As a result of the special configuration of the arrangement of the present invention, a loop of the strip-shaped material 5 can be slid over the two long inner sections *4b* and *4c* until it reaches the two neighboring bending locations. In this manner, a time-consuming and cumbersome threading operation is avoided. When a pull is exerted on the strip-shaped material 5, the two inner sections *4b* and *4c* are selectively pulled against one of the outer sections *4a* or *4d* as a result of resistance to uncoiling of the strip-shaped material 5, in which manner the clamping action of the holding element 4 on the strip-shaped material 5 is assured. Smooth travel of the arrangement about the supporting rollers for the conveyor belt 1 is assured by using the two relatively narrow U-shaped brackets 2 and 3 which are connected to one another only by a means of the clamp or holding element 4. The central extension *4f* which has a stepped configuration and which extends over the conveyor belt 1, prevents, on the one hand, the confined part of the conveyor belt 1 from becoming disengaged from the brackets 2 and 3 during the travel of the arrangement about a roller supporting the conveyor belt 1 and, on the other hand, any rapid disengagement and displacement of the clamp 4 from the conveyor belt 1 during disengagement of the brackets 2 and 3 from the conveyor belt, so that the possibility that water droplets or spray could be deposited on the already dried material due to this rapid displacement is avoided. The clamp or holding element 4 is loosely supported on the conveyor belt 1 by the central portion *4f*, and the spreading hook prevents entrainment by the conveyor belt 1. In a further development of the invention, the two brackets 2 and 3 can be slightly tilted relative to one another so that they make an angle smaller than 180°. In this manner, excessive tensioning of the conveyor belt 1 during travel of the arrangement around the supporting rollers for the conveyor belt 1 is avoided.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. An arrangement for transporting strip-shaped material, particularly photographic paper, comprising a conveyor belt; means for holding the strip-shaped material, including a one-piece elongated holding element extending along a triple-turn hairpin course to form four holding sections which are substantially parallel to one another and define with each other three spaces for clampingly engaging the strip-shaped material, said sections having effective lengths at least equal to the width of the strip-shaped material and two of said sections having free ends; and means for attaching said holding element to said conveyor belt, including two discrete brackets each affixed to a different one of said free ends and both separably connected to said conveyor belt.

2. An arrangement as defined in claim 1, wherein at least said sections of said holding element have round cross-sections.

3. An arrangement as defined in claim 1, wherein each of said brackets has a substantially C-shaped configuration and embraces said belt.

4. An arrangement as defined in claim 1, wherein said free ends extend substantially at right angles to the remainder of the respective sections, said brackets being welded to the respective free ends.

5. An arrangement as defined in claim 4, wherein said sections are disposed substantially in a common plane and said two sections are the outer sections of said four sections, the inner two sections extending along a stepped course between said brackets at one side of said conveyor belt.

6. An arrangement as defined in claim 1, wherein said sections are disposed substantially in a common plane and further include two inner sections which abut one another, each of said inner sections abutting one of said first mentioned two sections in the absence of strip-shaped material in said spaces.

7. An arrangement as defined in claim 1, wherein said holding element includes turn regions interconnecting said sections, said regions having relatively small radii of curvature and extending along arcs exceeding 180° in unstressed condition of said holding element to resiliently press the neighboring sections against one another.

* * * * *